United States Patent
Vonheim et al.

(10) Patent No.: US 7,031,660 B2
(45) Date of Patent: Apr. 18, 2006

(54) METHOD FOR TRANSFERRING A DEVICE IDENTIFIER BLOCK ON A SECOND COMMUNICATION LINK SEPARATED FROM THE BLUETOOTH LINK

(75) Inventors: Thomas Vonheim, Malmö (SE); Patrik Olsson, Malmö (SE)

(73) Assignee: Connectblue AB, Malmo (SE)

( * ) Notice: Subject to any disclaimer, the term of this patent is extended or adjusted under 35 U.S.C. 154(b) by 7 days.

(21) Appl. No.: 10/473,499

(22) PCT Filed: Mar. 26, 2002

(86) PCT No.: PCT/SE02/00591

§ 371 (c)(1),
(2), (4) Date: Mar. 3, 2004

(87) PCT Pub. No.: WO02/082742

PCT Pub. Date: Oct. 17, 2002

(65) Prior Publication Data

US 2004/0137845 A1  Jul. 15, 2004

(30) Foreign Application Priority Data

Apr. 4, 2001  (SE) .................................... 0101201

(51) Int. Cl.
*H04B 5/00* (2006.01)
(52) U.S. Cl. .................... 455/41.2; 455/411
(58) Field of Classification Search ............ 455/41.2, 455/41.3, 410, 411, 552.1, 553.1; 380/247, 380/270
See application file for complete search history.

(56) References Cited

U.S. PATENT DOCUMENTS

| | | | |
|---|---|---|---|
| 2001/0007815 A1* | 7/2001 | Philipsson | 455/41 |
| 2002/0123325 A1* | 9/2002 | Cooper | 455/411 |
| 2002/0161658 A1* | 10/2002 | Sussman | 705/26 |

FOREIGN PATENT DOCUMENTS

| | | |
|---|---|---|
| WO | WO 99/17477 A2 | 4/1999 |
| WO | WO 99/17477 A3 | 4/1999 |
| WO | WO 02/07387 A1 | 1/2002 |

* cited by examiner

*Primary Examiner*—Lee Nguyen
(74) *Attorney, Agent, or Firm*—Patterson, Thuente, Skaar & Christensen, P.A.

(57) ABSTRACT

Method for communicating information between a first device comprising means for communicating through a BLUETOOTH link and at least one second device also comprising means for communicating through a BLUETOOTH link. A connection link separated from the BLUETOOTH link is established between said first device and said at least one second device. A device identifier block includes data required for establishing and maintaining a BLUETOOTH link communication between said first device and a second device. The device identifier block is transferred through the connection link separated from the BLUETOOTH link.

13 Claims, 4 Drawing Sheets

METHOD FOR TRANSFERRING A DEVICE IDENTIFIER BLOCK ON A SECOND COMMUNICATION LINK SEPARATED FROM THE BLUETOOTH LINK

TECHNICAL FIELD

The invention relates to a method and a device for communicating information between a first device comprising means for communicating through a BLUETOOTH link and at least one second device also comprising means for communicating through a BLUETOOTH link.

BACKGROUND OF THE INVENTION

BLUETOOTH wireless technology is a de facto standard, as well as a specification for small-form factor, low-cost, short-range radio links between mobile PCs, mobile phones and other portable devices. When two BLUETOOTH devices are about to communicate with each other a connection must be set up. One device, the initial master, must set up the connection using a specific BLUETOOTH device address of the other device.

The BLUETOOTH base-band supports link level authentication. When authentication is enabled a PIN (Personal Identification Number) code must be entered on both devices wanting to communicate before a connection (link) can be established. The same PIN code is entered on both devices. The PIN code is only valid between the two devices active at the moment. A device can use different PIN codes for different devices it wants to communicate with. Once authentication has been performed the devices may choose to save a link key so that the PIN code does not have to be entered each time a connection is set up.

The BLUETOOTH base-band supports encryption. To enable encryption a PIN code must be entered on both devices wanting to communicate (same process as for authentication). The PIN code is used to create the key for the encryption.

If a device has authentication turned off, any device can connect to this device given that its BLUETOOTH device address is known. It is possible to "snoop" the BLUETOOTH device address by listening to its communication with other devices.

A BLUETOOTH device normally keeps the following information stored:
  BLUETOOTH device address (48-bit unique number identifying the device).
  Other BLUETOOTH device specific information (e.g. name, class of device, clock offset, page scan mode).
  PIN code to be used when connecting to this device.
  The services it supports (e.g. LAN access profile, Serial port profile, etc.
  Proprietary information. Information that is specific to a certain vendor.

The information in the list above is from now on called the Device Identifier Block, the DIB for short. All or part of the information in the DIB is needed to be able to quickly and securely establish a BLUETOOTH link with a remote device.

Usually the BLUETOOTH device address is found by doing an INQUIRY. The INQUIRY procedure is a search procedure; it will return all the BLUETOOTH device addresses of all devices that are in the vicinity. For a device to respond to an INQUIRY it has to be in INQUIRY_SCAN mode. This makes it visible to all devices performing INQUIRY. When an INQUIRY has been made the user usually is prompted with a list of devices to choose from. Once a device has been chosen, its BLUETOOTH device address can be saved for future connections.

An INQUIRY procedure usually takes 10 seconds. If the names of the remote devices are desired (usually the case when users are requested to select from a list) a name request for each BLUETOOTH device address must be performed. This procedure will take 2.57 seconds in average for each device. Traditionally, in BLUETOOTH, most of the information contained in the DIB, is transferred from one device to another using the INQUIRY procedure.

Not all devices have user interface to enable the user to select the appropriate device after an INQUIRY (a search), which may cause problems where several devices are present. In some scenarios, e.g. for security reasons, a device cannot be in INQUIRY_SCAN since it might not be suitable for it to be visible to other devices performing INQUIRY. It should be noted that a BLUETOOTH device in INQUIRY_SCAN mode will respond to INQUIRY from all devices.

In scenarios where a device often changes the device it communicates with the INQUIRY procedure is to long to be suitable every time a change is to be performed. In other scenarios where none of the devices communicating have user interface to enter a PIN code authentication and encryption cannot be used.

In scenarios where it is absolutely critical that you are communicating with the correct device the search and select procedure using INQUIRY and name request is not secure enough.

SUMMARY OF THE INVENTION

An object of the present invention is to overcome the drawbacks and the problems mentioned above. In accordance with the invention a second communication link is established between a first BLUETOOTH device and at least one second BLUETOOTH device. In the second communication link communication media other than BLUETOOTH is used to perform an out-of-band transfer of at least one DIB.

What to do with a received DIB may vary depending on the application. In fact, in some scenarios multiple DIBs may be transferred from one device to another. In this case the DIBs do not contain information about the device they came from, instead they might describe other devices used in that scenario.

In accordance with the invention different media can be used for transferring a DIB. It is for instance possible to use wired, optical or inductive communication media. Also a removable storage media can be used. In either case at least the following events can trigger the transfer of DIBs between two devices. Connectors of the devices touch each other or their transceivers come in range. As an alternative the user presses a button.

In accordance with different embodiments of the invention different advantages will be obtained. Devices using the present invention do not have to be in INQUIRY_SCAN to be discovered; they can be discovered using out-of-band transfer of their DIB instead. BLUETOOTH link-level authentication and encryption can be used without having to enter a PIN code. The PIN code is transferred in the out-of-band transfer of the DIB.

No user interface is needed to bond with another BLUETOOTH device. Traditionally bonding involves, searching, selecting and entering a PIN code. With an out-of-band transfer of DIBs this procedure can be done quickly and in one step.

A user can quickly change the device he is communicating with by simply receiving the new device's DIB. Traditionally this would have involved searching and selecting or at least selecting from a list from a previous search. A user/device can be absolutely sure that he/it is communicating with the correct device.

The DIB contains device specific information, such as BLUETOOTH device address, class of device, clock offset, etc. In addition it contains service specific information, more precisely information about which services the device offers. Examples of such services (but not limited to) can be headsets, LAN access means, speaker and light-switches. A device may support more than one service. By including service information in the DIB a multi-function receiving device is capable of using the received information in an appropriate way. E.g. a music stereo device has the ability to connect to both a headset and a microphone. Using out-of-band transfer the DIB of the headset and the microphone are transferred to the stereo. So from now on, since the stereo can see in the DIB that one DIB belongs to a headset and the other belongs to a microphone, it knows which BLUETOOTH device address to use when connecting to the headset or the microphone, respectively.

In some scenarios it might be suitable to encrypt the DIB before transferring it to another device. A PIN code or a password will be required to decrypt the DIB. Since the transfer of DIBs is designed to operate on many different communication media the DIB transfer protocol is different for different media.

However, common to all DIB transfer protocols is that they always support a service such as the transfer of a DIB. Furthermore, if the transfer of the DIB fails, at least the receiving device must be able to detect that the transfer has failed.

Further advantages and special features of the invention appear in the following description, drawings, and dependent patent claims.

DETAILED DESCRIPTION

Figure 1:
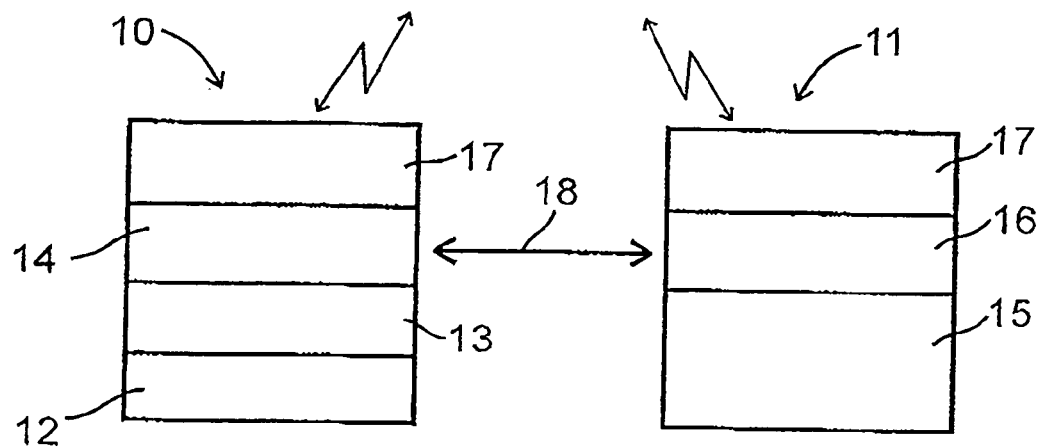
FIG. 1 is a schematic diagram showing a basic embodiment of the invention.

The basic embodiment of the invention shown in FIG. 1 comprises a first device 10 and a second device 11. The first device 10 comprises an input output device 12 and a control unit 13. The input output device 12 can include a keyboard or a push button or similar means. In some embodiments it is not necessary to provide an input output device 12 at all.

The first device also comprises a first communication means 14. The second device 11 comprises a service unit 15 and a second communication means 16. First and second communication means are provided to utilise a common communication media 18. First and second devices 10, 11 comprise a conventional BLUETOOTH communication means 17.

In accordance with the invention first and second communication means 14, 16 are used to establish a connection link through said communication media 18 separated from a BLUETOOTH link that can be established between the BLUETOOTH communication means 17. The connection link is used to transfer any identifier data required for establishing and maintaining the BLUETOOTH link communication between the first device 10 and the second device 11. Said identifier data is collected in a device identifier block, DIB.

The communication media 18 can be a wired communication media including RS232 (UART), SPI, I2C and Ethernet. In all embodiments using a wired communication media there is normally required a common connector on both devices exchanging DIBs.

Figure 2:
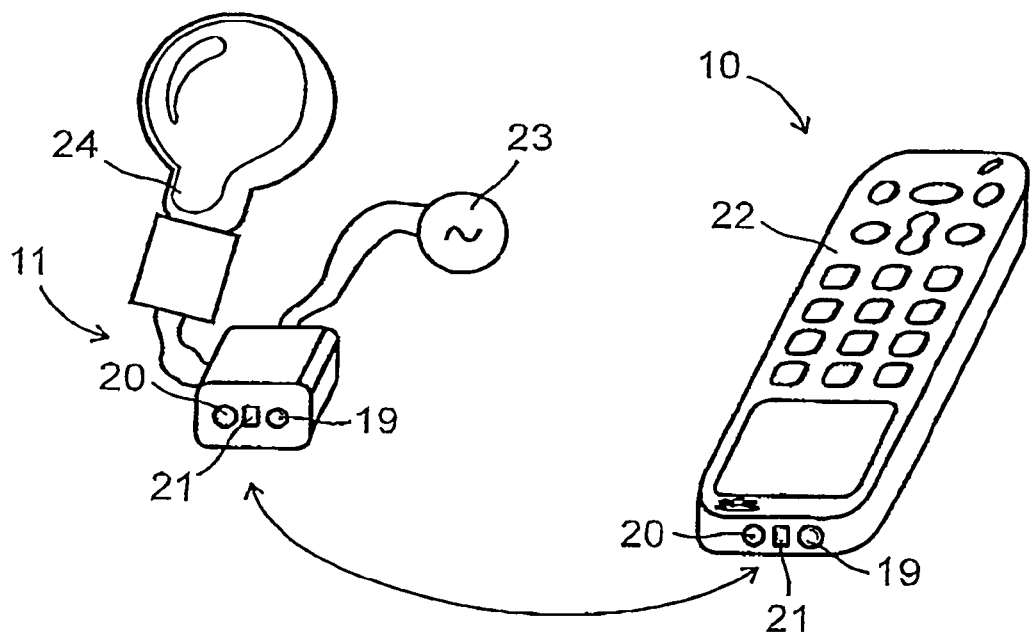
FIG. 2 schematically shows a first embodiment of the invention.

An example of a wired communication media is shown in FIG. 2 where a RS232 connector is used. The connector comprises three terminals, a receive data (RX) terminal 19, a transmit data (TX) terminal 20 and a ground (GND) terminal 21. A connector comprising all of the terminals is connected to a UART (Universal Asynchronous Receiver/Transmitter). The UART supports an invent named Oncableinserted that occurs when two terminals touch.

In FIG. 2 one connector comprising a receive data terminal 19, a transmit data terminal 20 and a ground terminal 21 is provided on a remote unit 22. The remote unit 22 operates as the first device and may operate also as a cellular telephone. A second device 11 is provided with a similar connector comprising a receive data terminal 19, a transmit data terminal 20 and a ground terminal 21. The second device 11 is connected to a mains outlet 23 for supplying power to a service unit 15 in the form of a light bulb 24.

The connectors are formed in such a way that when two connectors touch, the receive data terminal 19 of one device automatically connects to a transmit data terminal 20 of the other device and vice versa. In the embodiment shown in FIG. 2 this is accomplished by forming the receive data terminal 19 of the first device 10 in a recess and the transmit data terminal 20 extending from the remote unit 22. The ground terminal 21 may be in alignment with a cover of the remote unit 22.

A corresponding connector is provided on the second device 11. The receive data terminal 19 is formed as a recess to receive the protruding transmit data terminal 20 of the first device 10. Correspondingly, the transmit data terminal 20 of the second device 11 protrudes and is formed to be received in the corresponding receive data terminal 19 of the first device 10. The ground terminal 21 of the second device is formed to engage the corresponding ground terminal 21 of the first device 10 when the devices are brought together.

The embodiment shown in FIG. 2 will operate as a remote controlled light switch. To use the device a user moves the remote unit 22 towards the first device 10, so as to bring the connectors of the two devices into contact with each other. Then an out-of-band transfer of the DIB of the second device occurs using the wired communication. To operate the light the user presses a selected button the remote unit to turn the light on. The connection between the first device and the second device is determined, because the remote unit 22 has received the DIB of the second device 11 including the device address. The remote unit 22 communicates with the second device 11 through the BLUETOOTH communication means during normal operation.

Figure 3:
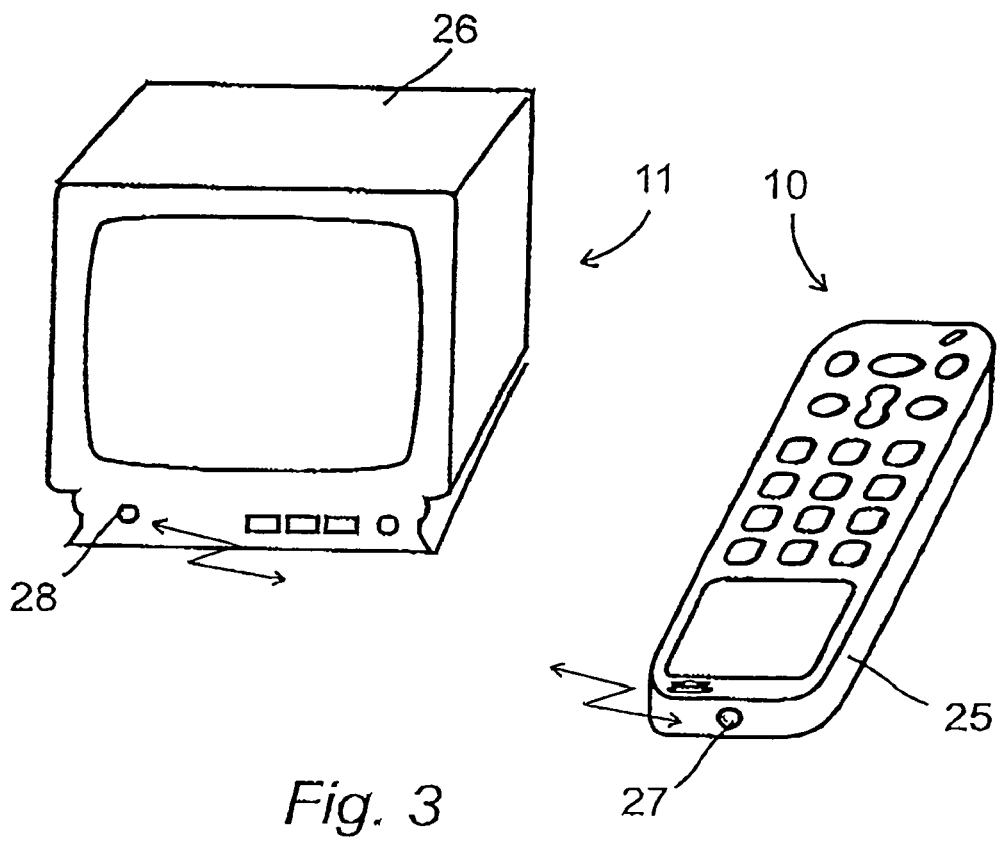
FIG. 3 schematically shows a second embodiment of the invention.

In the embodiment shown in FIG. 3 a first device 10 comprises a remote unit 25. The second device 11 comprises a TV set 26. The first device 10 and the second device 11 are both provided with a BLUETOOTH communication means (not shown in the drawing). In this embodiment there is provided an optical communication media to transfer the DIB of the second device 11 to the first device 10. The optical communication media preferably is an infrared communication media using a standard communication through infrared light as described by the IRDA organisation. The DIB is transferred using normal IRDA communication protocols. For this purpose an infrared light receiving diode 27 is provided on the remote unit 25 and a corresponding light emitting diode is provided on the TV set. Normally both devices are capable of transferring information in both directions.

In the embodiment shown in FIG. 3 the remote unit 25 operates as a traditional TV remote control, in this case communicating with the TV set using a BLUETOOTH communication means. To be able to communicate with the TV set the remote control unit 25 must know the BLUETOOTH device address of the TV set 26. An out-of-band transfer of the DIB from the TV set to the remote unit is used, for instance after pushing a selected key on the remote unit 26 for requesting the TV set to transfer the requested DIB. Normally, an IR communication link requires the two devices to be in site of each other, thereby avoiding communication with other devices.

Figure 4:
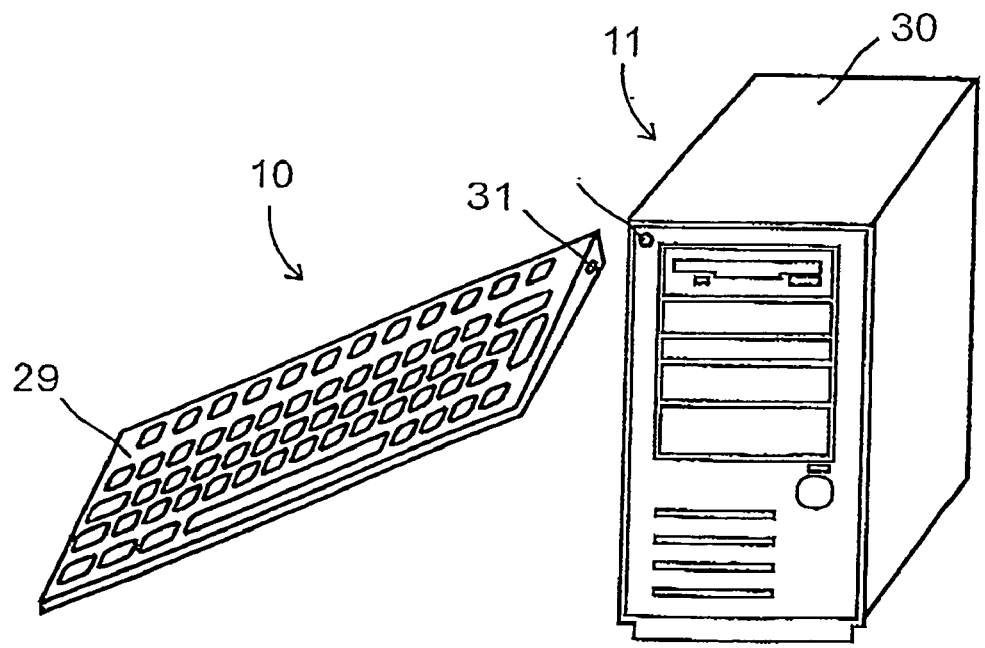
FIG. 4 schematically shows a third embodiment of the invention.

Another wireless communication method is shown in FIG. 4. The first device comprises a keyboard 29, and the second device comprises a computer 30. The keyboard 29 is provided with an inductive communication means 31. A corresponding second inductive communication means 32 is provided on the computer 30. By bringing the keyboard 29 in close proximity with the computer 30 the DIB will be transferred from the computer to the keyboard. Also in this wireless solution other devices will not interfere in the communication between the selected first device 10 and second device 11.

Figure 5:
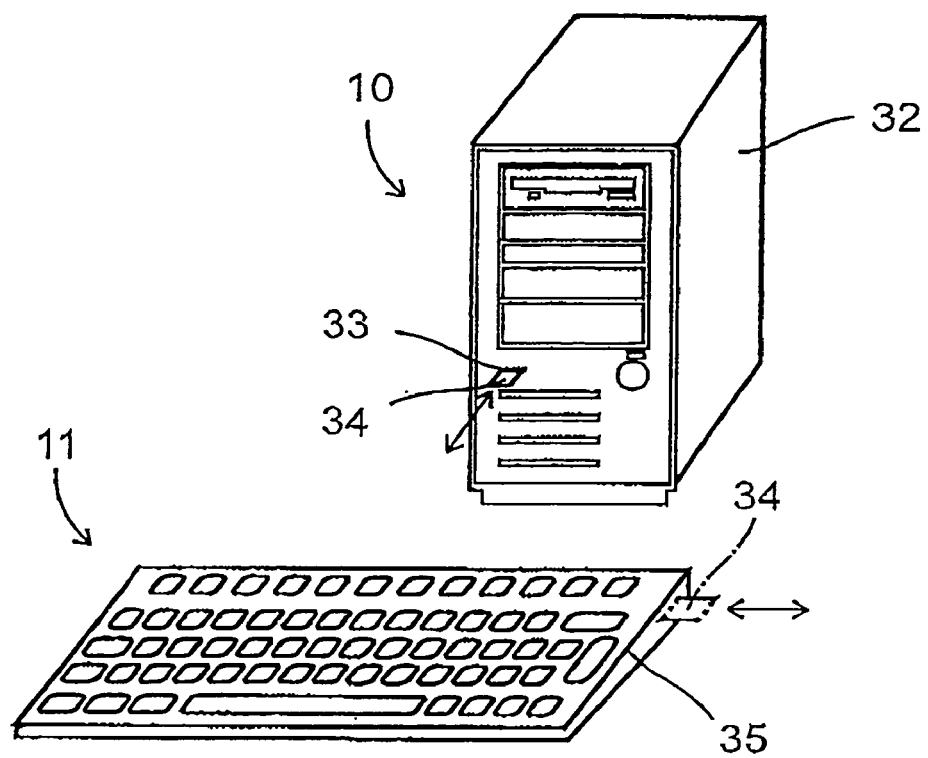
FIG. 5 schematically shows a fourth embodiment of the invention.

A fourth embodiment of the invention is shown in FIG. 5. The first device 10 comprises a computer 32 having means 33 for receiving a removable storage media, such as a multimedia card, MMC, or a compact flash storage card. A memory card 34 is shown partly inserted in the computer 32. One or more DIBs are stored on the removable storage media. To transfer the DIB from the computer 32 to the second device comprising a keyboard 35 the storage media 34 is removed from the first device and then inserted into the second device. The second device reads the appropriate DIBs from the storage media.

Any of the out-of-band transfer modes described above can be used also in other embodiments. Consider for example a simple device, such as a data-collecting device, which is designed to communicate with a LAN via a BLUETOOTH LAN access point. Normally, there would be a problem for a first device to know which BLUETOOTH device address to connect to. An out-of-band transfer of the DIB from the LAN access point to the simple device will solve this problem. In such a scenario a wired out-of-band transfer of the DIB might be most appropriate.

A user intending to connect his data-collecting device to a network via a BLUETOOTH LAN access point moves the data-collecting device into engagement with the LAN access point to touch a connecting means, so that the LAN access point can transfer the DIB to the data-collecting device. Then it is possible for the user to connect to the network via the BLUETOOTH LAN access point, since the data-collecting device now knows the correct BLUETOOTH device address to connect to.

When one of said first device and said second device comprises a display and a keyboard it is possible for a user to select which device to communicate with on the basis of the information given on the display. The displayed information may include device specific information such as a chosen name for the device and also the services supported by the device. Such information facilitates the selection of a specific device when a plurality of devices is available.

Even when all BLUETOOTH devices in a specific area lack a display the invention will facilitate a connection between two selected devices. By using for instance an inductive out-of-band transfer of the DIB it will be possible for a user of a first device to establish contact with and communicate with anyone of a plurality of available devices. For each device the user of the first device would like to establish contact with the devices are brought into the vicinity of each other to transfer the required DIB between the devices. Then it is possible to establish a standard BLUETOOTH connection between the first device and the selected second device.

Figure 6:
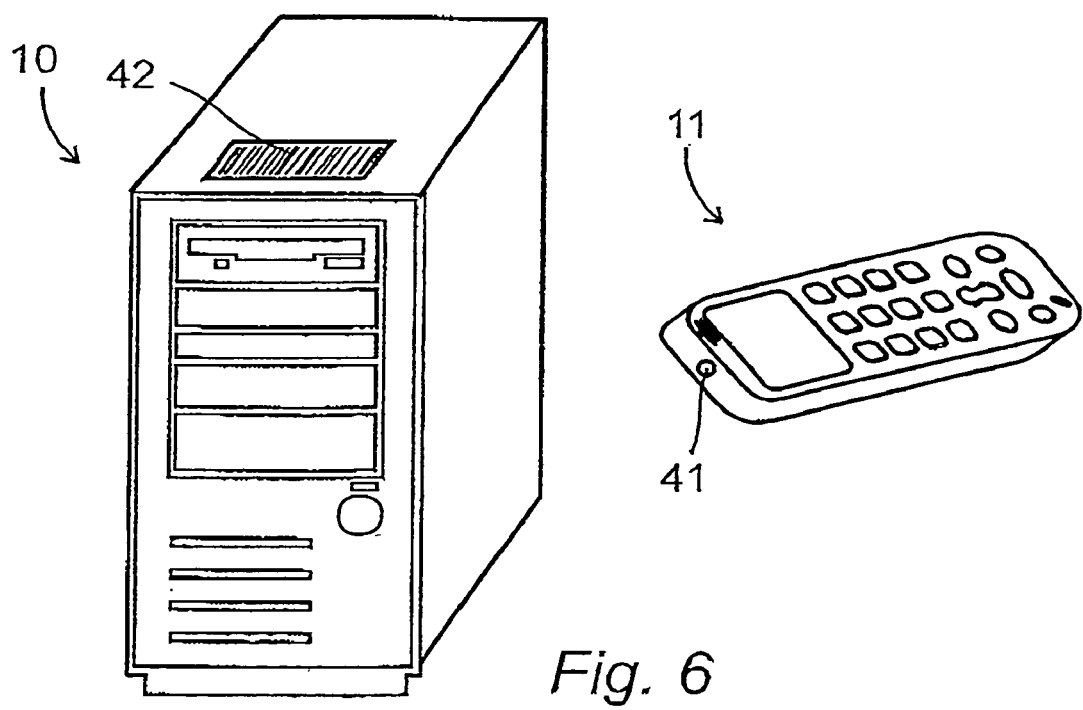
FIG. 6 schematically shows a fifth embodiment of the invention.

Another optical type connection link is shown in FIG. 6. The second device 11 is formed as a cellular telephone and comprises a bar code reader 41. The corresponding first device 10 is formed as a computer and is provided with a bar code 42 carrying any required and appropriate device identifier data. A connection link between the first and the second device is established when the bar code reader is moved into the vicinity of the bar code, so as to be able to read the bar code. After reading the bar code and extracting the required information therefrom the BLUETOOTH link communication between said first device and a second device could be established and maintained.

Figure 7:
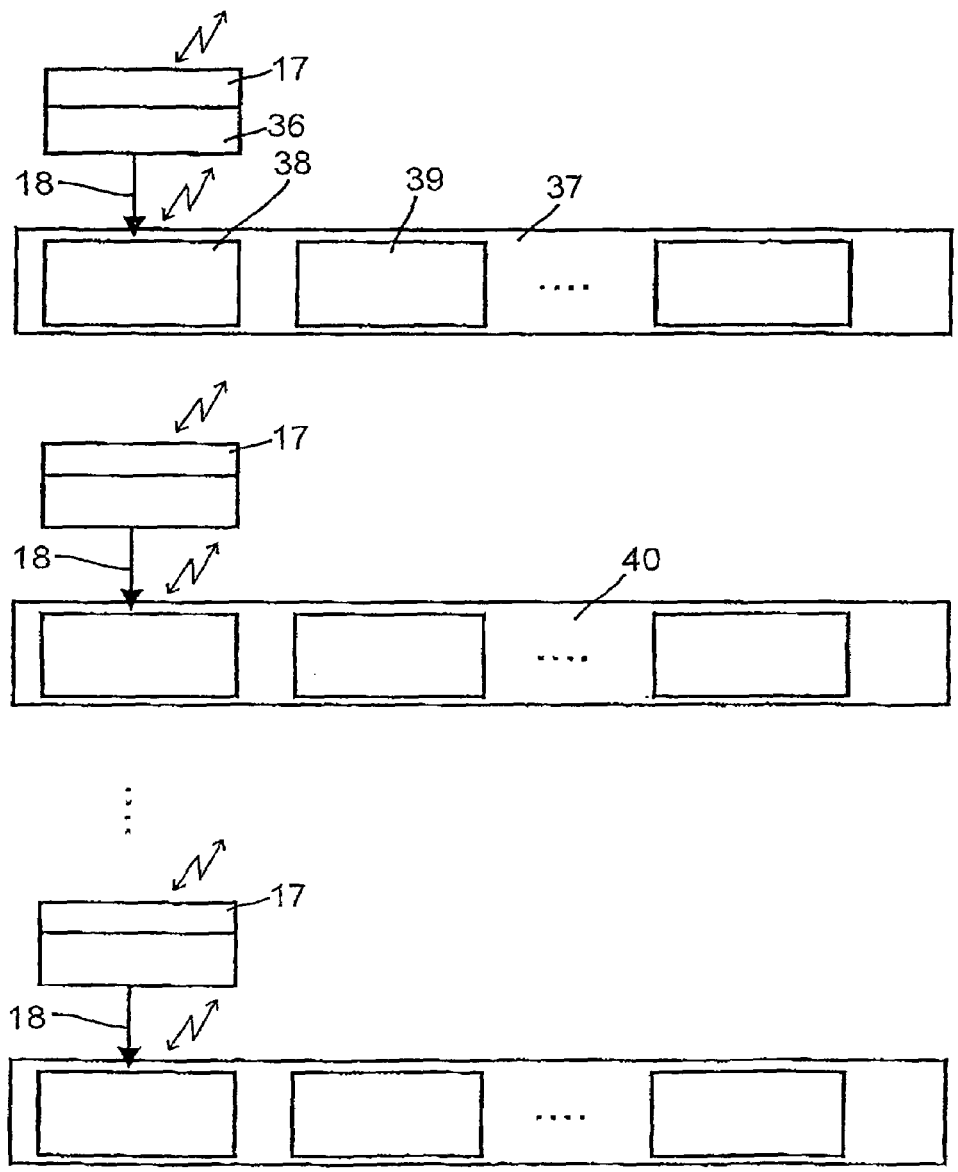
FIG. 7 schematically shows a sixth embodiment of the invention.

A fifth embodiment of the invention as shown in FIG. 7 relates to a shop with a large number of cash registers. Shoppers are able to pay their merchandise using a WAP browser in their cellular telephones. A problem in such an embodiment is to ensure that the shopper will pay the correct bill, by communicating with the correct cash register. A search and select procedure may take too much time and still it may not be obvious to select the correct cash register to connect to.

As shown in FIG. 7 a first cash register 36 is arranged at a first line 37. A first user 38, a second user 39 and a plurality of other users are lined up in the first line 37. A second line 40 and a plurality of further lines are arranged in a similar manner as the first line.

When the first user 38 is prepared to pay his bill at the first cash register 36 using the WAP browser in a cellular telephone the user passes the telephone in front of the cash register 36. The DIB of the cash register 36 is then transferred to the cellular telephone, for instance using an inductive communication media 18. After the transfer of the DIB the cellular telephone can securely connect to the correct cash register, because the correct BLUETOOTH device address to use is known. Other devices in other lines will not effect the communication between the cash register 36 and the cellular telephone of the first user 38.

In either type of connection link provided in accordance with the present invention a PIN code can be a part of the information transferred between the first device and the second device. In this way the transfer of secure information to any undesired device can be avoided. After transferring the PIN code a BLUETOOTH authentication and encryption process can be initiated and completed.

According to the invention it is possible also to transfer multiple DIBs. An access point is provided to cover a plurality of BLUETOOTH devices. The DIB of each of the devices associated to the access point is transferred to the access point in advance. By using a communication media 18 other than BLUETOOTH a user may access any selected DIB previously transferred to the access point. In a practical embodiment a user removes a storage card from a portable device and inserts it in the access point. The access point may be provided with a keyboard and a display to allow the user to select a specific device or a plurality of devices associated to the access point. Information corresponding to each of the DIB of the selected devices is transferred to the storage card. The storage card can then be removed from the access point and again inserted in the portable device. A suitable software in the portable device reads the DIB information in the storage card and enables the user to connect to any selected device.

The invention claimed is:

1. A method for communicating information between a first device comprising means for communicating through a BLUETOOTH link and at least one second device also comprising means for communicating through a BLUETOOTH link, the method including the steps of:
   establishing a connection link separated from the BLUETOOTH link between said first device and said at least one second device;
   transferring, in a device identifier block, data required for establishing and maintaining a BLUETOOTH link communication between said first device and a second device;
   storing a device identifier block of at least one first device in a removable storage media;
   moving said removable storage media to a second device;
   reading said device identifier block in the second device; and
   establishing the connection link when the device identifier block has been read.

2. The method as claimed in claim 1, further including the steps of:
   providing a wired link as the connection link separated from the BLUETOOTH link; and
   establishing the connection link when a connector of said first device engages a corresponding connector of said second device.

3. The method as claimed in claim 1, further including the steps of:
   providing an inductive link as the connection link separated from the BLUETOOTH link; and
   establishing the connection link when a connecting means of said first device is in the vicinity of a corresponding connecting means of said second device.

4. The method as claimed in claim 1, further including the steps of:
   providing an optical link as the connection link separated from the BLUETOOTH link; and
   establishing the connection link when an optical communicating means of said first device is in sight of a corresponding optical communicating means of said second device.

5. The method as claimed in claim 1, further including the steps of:
   providing a bar code exhibiting data corresponding to the device identifier block of a first device on the first device;
   providing a bar code reader in said second device; and
   establishing the connection link when the bar code reader is able to read the bar code.

6. A device for communicating information between a first device comprising BLUETOOTH communication means and at least one second device also comprising BLUETOOTH communication means, comprising:
   a first communication means at said first device, said first communication means separated and different from the BLUETOOTH communication means; and
   a second communication means at said second device separated and different from the BLUETOOTH communication means,
   wherein said first communication means and said second communication means are adapted to communicate over a communication media different from BLUETOOTH and to transfer identifier data required for establishing and maintaining a BLUETOOTH link communication between said first device and said second device, and
   wherein said first device and said second device comprise means for receiving a removable storage media, and wherein said first communication means and said second communication means are adapted to read/write a device identifier block stored in the removable storage media.

7. The device as claimed in claim 6, wherein said first communication means and said second communication means comprise terminals for a physical connection between said first device and said second device.

8. The device as claimed in claim 7, wherein said terminals include a receive data terminal, a transmit data terminal, and a ground terminal, the receive data terminal of each of said first device and said second device being formed to engage exclusively with the transmit data terminal of said second device and said first device, respectively.

9. The device as claimed in claim 6, wherein said first communication means and said second communication means comprise inductive communication means.

10. The device as claimed in claim 6, wherein said first device and said second device comprise optical communication means operating as the communicating media.

11. The device as claimed in claim 6, wherein said first device is provided with a bar code exhibiting data including the device identifier data, and wherein said second device comprises a bar code reader adapted to read said device identifier data.

12. A method for communicating information between a first device comprising means for communicating through a BLUETOOTH link and at least one second device also comprising means for communicating through a BLUETOOTH link, the method including the steps of:
   establishing a connection link separated from the BLUETOOTH link between said first device and said at least one second device;
   transferring, in a device identifier block, data required for establishing and maintaining a BLUETOOTH link communication between said first device and a second device;
   providing a bar code exhibiting data corresponding to the device identifier block of a first device on the first device;
   providing a bar code reader in said second device; and
   establishing the connection link when the bar code reader is able to read the bar code.

13. A device for communicating information between a first device comprising BLUETOOTH communication means and at least one second device also comprising BLUETOOTH communication means, comprising:
- a first communication means at said first device, said first communication means separated and different from the BLUETOOTH communication means; and
- a second communication means at said second device separated and different from the BLUETOOTH communication means,
- wherein said first communication means and said second communication means are adapted to communicate over a communication media different from BLUETOOTH and to transfer identifier data required for establishing and maintaining a BLUETOOTH link communication between said first device and said second device, and wherein said first device is provided with a bar code exhibiting data including the device identifier data, and wherein said second device comprises a bar code reader adapted to read said device identifier data.

* * * * *